Dec. 14, 1965     D. L. MORGAN     3,223,001

POWER ELEMENT ASSEMBLY

Filed Nov. 4, 1963

INVENTOR
David L. Morgan

BY *Birch and O'Brien*

ATTORNEYS

United States Patent Office 3,223,001
Patented Dec. 14, 1965

3,223,001
POWER ELEMENT ASSEMBLY
David L. Morgan, Shelton, Conn., assignor to Robertshaw Controls Company, Richmond, Va., a corporation of Delaware
Filed Nov. 4, 1963, Ser. No. 321,146
7 Claims. (Cl. 92—91)

This invention relates to expansible and collapsible power element assemblies of the type utilizing diaphragms of bellows for the transmission of power in connection with pressure sensitive or thermal sensitive devices.

An object of this invention is to construct a relatively simple power element capable of responding to high pressures.

Another object of this invention is to assure a welded edge connection between the diaphragm means and the housing therefor in a power element.

The present invention has another object in that the diaphragm housing edge of a power element serves as a heat sink in welding the diaphragm edge thereto.

This invention has a further object in that a power element is provided with stop means on its flexible means to define its limit of movement.

In accordance with the present invention, a power element includes operating and stud elements in opposed relation, diaphragm means adapted to expand and contract in response to pressure variations, one portion of the diaphragm means engages the operating element and another portion thereof is connected to the stud element, and the diaphragm means is provided with stop means to limit expanding movement thereof in response to increasing pressure variations.

Figure 1:
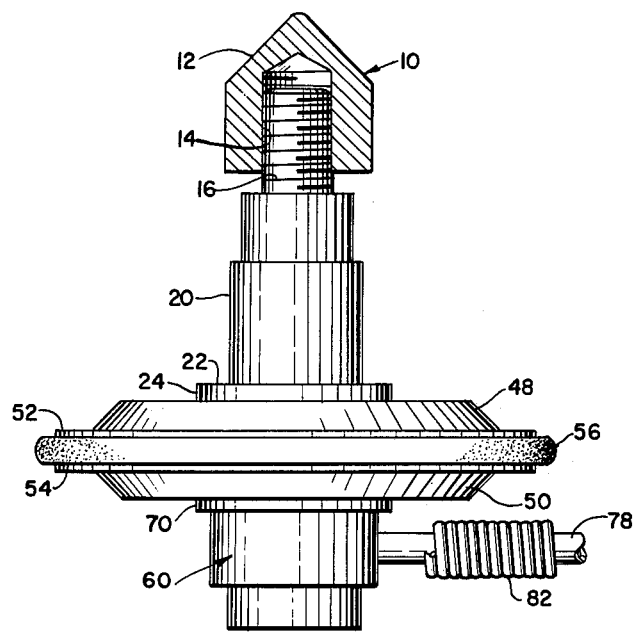
Figure 2:
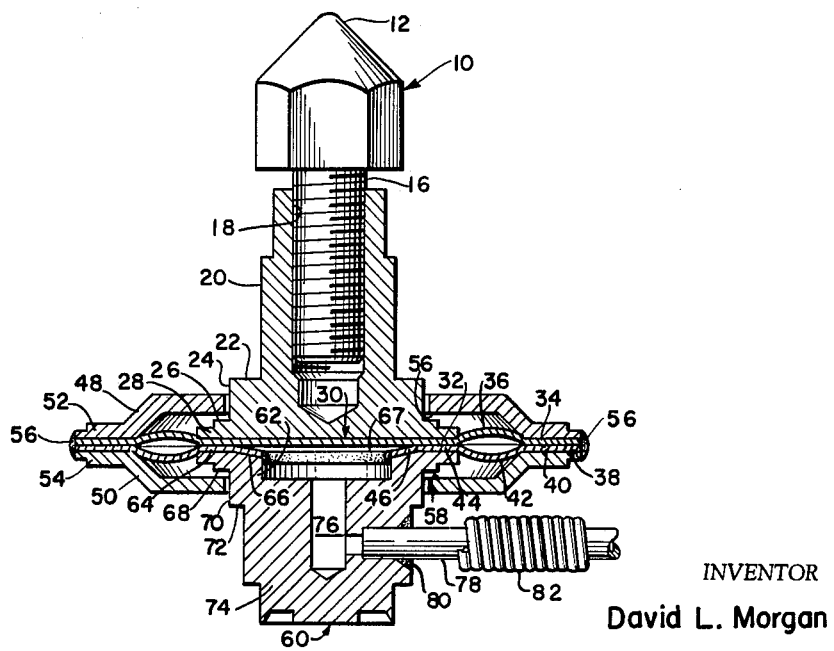

Other objects and advantages of the present invention will become apparent from the following description of a preferred embodiment taken in connection with the accompanying drawing wherein:

FIGURE 1 is an elevation view, with parts in section, of a power element embodying the present invention; and FIGURE 2 is a partial vertical cross section of FIGURE 1.

As is illustrated in FIGURES 1 and 2, the preferred embodiment of the present invention includes a power element having an operating button 10 on one end. The button 10 has an exterior conical shape 12 on one end and an internally threaded bore 14 on the other end. An externally threaded shaft 16 has one end adjustably received in the bore 14 and an opposite end adjustably received in the threaded bore 18 of a generally cylindrical operating sleeve 20.

On the end opposite the bore 18, the operating sleeve 20 is diametrically enlarged in steps; the first enlargement defines an annular shoulder 22 joined with a cylindrical wall 24 which joins the second enlargement that defines a second annular shoulder 26. The annular shoulder 26 is joined with the sleeve's lowermost plate 28 (FIGURE 2), the undersurface of which is in surface contact with the exterior central portion 32 of a flexible diaphragm 30. The flexible diaphragm 30 has a flat annular portion 34 on its periphery and an intermediate arcuate portion 36 between the two flat portions 32 and 34.

A flexible diaphragm 38, oppositely disposed to the diaphragm 30, is provided with a flat annular portion 40 on its periphery, an intermediate arcuate portion 42 and an apertured central portion including a flat part 44 and a downwardly inclined part 46 which terminates at the central aperture of the diaphragm 38. The two diaphragms 30 and 38 form a mated pair to define a diaphragm chamber therebetween which is closed at its periphery by surface contact between peripheral portions 34 and 40. The annular arcuate portions 36 and 42 of the opposed diaphragms 30 and 38 define concave and convex surfaces, respectively, while the flat portions 32 and 44 thereof define surface engaging portions.

The diaphragm assembly is completed by sandwiching the peripheral portions 34 and 40 between the annular peripheral portions 52 and 54 of oppositely disposed diaphragm cups 48 and 50, respectively, and uniting the outer edges of all these peripheral portions by heli-arc welding, indicated at 56 extending around the circumference thereof.

It should be noted that outer peripheral edges of the diaphragm portions 34 and 40 and of the cup portions 52 and 54 present a wide area which simplifies the problem of edge welding. While edge welding of opposed diaphragms was not impossible prior to the present invention, it was extremely difficult to effect a proper weld because of the small edge area. According to the present invention the weldable edge area is increased by welding the edges of the cup portions 52 and 54 with the edges of the diaphragm portions 34 and 40. In addition to presenting a larger welding area, the cup portions 52 and 54 are utilized to clamp the diaphragm portions 34 and 40 in place during the welding operation and also serve as a heat sink during such welding.

The diaphragm cups 48 and 50 are each centrally apertured in the bottom walls to define aligned apertures. As is shown in FIGURE 2, the interior areas surrounding such apertures present opposing surfaces which define upper and lower shoulder abutments 56 and 58, respectively.

The exterior surface of diaphragm portions 44 and 46 are in surface contact with the top surface of a mounting stud 60; to this extent, the stud 60 includes a centrally bored upper plate 62 having the same general configuration as sleeve plate 28 except that its diaphragm engaging surface includes a flat annular surface 64 and a downwardly inclined annular surface 66 to conform to the diaphragm surfaces 44 and 46, respectively. The lower diaphragm 38 is joined to the mounting stud 60 by a heli-arc welding, indicated at 67 extending around the adjoining edges of central bore of the plate 62 and the inclined surface 66. The exterior of the stud 60 has a stepped circumference similar to the sleeve 20, i.e., an annular shoulder 68 on the plate 62 joined by a cylindrical wall 70 leading to a second annular shoulder 72. The lowermost portion of stud 60 is necked-down to define a cylindrical mounting post 74.

The elements so far described are all made of stainless steel including the diaphragms 30 and 38 which thus define metallic type diaphragm elements that flex between expanded and contracted positions.

As is illustrated in FIGURE 2, the stud 60 is suitably bored to define internal passage means 76, one end of which communicates with the space between the upper and lower diaphragms 30 and 38 through the central aperture of its upper plate 62. The other end of passage means 76 receives the end of a copper capillary tube 78 which is secured to the stud 60 as by silver solder 80. The protruding portion of capillary tube 78 is encircled by a protector in the form of a coil spring 82 to prevent breakage of the tube from sharp edges.

The free end of the capillary tube 78 may be connected to the particular system to which the power element is to be responsive, i.e., temperature responsive or pressure responsive. For the purposes of describing the operation of the power element, it will be assumed that the free end of the capillary tube is connected to a pressurized system whereby the power element will expand and contract in response to pressure variations in the system.

While the diaphragms 30 and 38 are in the collapsed position shown in FIGURE 2, the flat surfaces 32 and 44 are in engagement with each other and define internal stop means for limiting the contraction of the diaphragms. Pressure increases in the diaphragm chamber causes separation of the diaphragms 30 and 38 and relative movement between the operating sleeve 20 and stud 60. If desired, the mounting stud 60 may be connected to a supporting structure by its mounting post 74 so that the lower end of the power element does not move and the total movement is applied to the operating sleeve 20.

Such movement is limited by stop means defined by the annular abutment shoulders 56 and 58 and the annular stop shoulders 26 and 68, respectively. As is apparent in FIGURE 2, the stop shoulders 26 and 68 are attached to the flexible diaphragms 30 and 38 for movement therewith. With such an arrangement the diaphragms 30 and 38 are subject to equal flexure which is particularly advantageous over conventional arrangements that provide unequal flexure or only flexure of one diaphragm between a pair of diaphragms.

The operating button 10 is adapted to operate a control device, such as a switch or valve, with the conical end 12 engaging a biased lever. Accordingly, the expansion of the diaphragms is transmitted through the sleeve 20 and button 10 to the control lever. The movement of the sleeve 20 necessary to actuate the control lever may be adjusted by the threaded screw 16, both in the button bore 14 and in the sleeve bore 18.

The power element returns from its expanded condition as soon as the pressure drops in the passage means 76. Due to the flexibility of the metallic diaphragms 30 and 38 and their respective arcuate portions 36 and 42, their return to the position shown in FIGURE 2 is assured where the flat surfaces 32 and 44 are in engagement to define the unstressed position of the power element.

Inasmuch as the present invention is subject to many variations and modifications and changes in structural details of the preferred embodiment, it is intended that all matter contained in the foregoing description and shown on the accompanying drawing shall be interpreted as illustrative and not in a limiting sense.

What is claimed is:

1. In a power embodiment, the combination comprising an operating element and a stud element oppositely arranged, diaphragm means adapted to expand and contract in response to pressure variations, said operating element being engaged by a portion of said diaphragm means, said stud element being connected to another portion of said diaphragm means, housing means for said diaphragm means, spaced abutment means on said housing means disposed on opposite sides of said diaphragm means, and stop means on said operating and stud elements cooperating with said abutment means for limiting expansion of said diaphragm means in response to increased pressure variations.

2. The combination as recited in claim 1, wherein said diaphragm means comprises two metallic diaphragms, one of which has a welded connection to said stud element.

3. In a power element, the combination comprising a pair of centrally apertured diaphragm cup members oppositely arranged to each other to define a space therebetween, an operating element having a lower plate disposed in the space between said cup members and having an upper portion extending out of one of said cup members, a bored stud member having an upper plate disposed in said space and having a lower portion extending out of the other of said cup members, diaphragm means disposed in said space between said lower and upper plates and adapted to expand and contract in response to pressure variations for moving said operating and stud members, said diaphragm means including a first flexible diaphragm contacting said lower plate and a second flexible diaphragm connected to said upper plate, means defining a central aperture extending through said upper plate and said second diaphragm whereby pressurized fluid from said bore stud member causes actuation of said flexible diaphragms in response to pressure variations, and means on the lower and upper plates of said flexible diaphragms and on said cup members to limit expanding of said flexible diaphragms in response to increased pressure variations.

4. The combination as recited in claim 3, wherein said last mentioned means comprises annular shoulders on said lower and upper plates and abutment means on said cup members engageable thereby to limit relative movement between said operating element and said stud member.

5. In a power element, the combination comprising a pair of centrally apertured metallic diaphragm cups oppositely disposed to each other to define a space therebetween, flat lips on said cups terminating in peripheral edges, a pair of flexible metallic diaphragms defining a diaphragm chamber disposed between said cups, flat peripheral portions on said diaphragms disposed between said flat lips and terminating in peripheral edges disposed between the edges of said flat lips, a welded connection joining the edges of said flat lips and the edges of said flat peripheral portions, an operating member extending through the central aperture of one of said cups and having a plate element in contact with one of said diaphragms for movement thereby, a bored member extending through the central aperture of the other cup and having an element secured to the other diaphragm for movement thereby, said bored member adapted to transmit pressurized fluid to the diaphragm chamber for expanding and contracting said diaphragms in response to pressure variations of the fluid.

6. The combination as recited in claim 5 wherein stop means are provided for said flexible diaphragms to limit relative movement between said operating member and said bored member.

7. In a power element, the combination comprising a pair of diaphragm cups having centrally apertured bottom walls and flat lips disposed adjacent each other, a pair of metallic diaphragms disposed between said cups and having flat peripheral portions disposed between said lips, welding means uniting said lips and said peripheral portions around their edges, one of said diaphragms having a concave annular portion and a central flat portion, the other of said diaphragms having a convex annular portion disposed adjacent said concave annular portion to define an annular space therebetween and having a centrally apertured central portion, said central portion having an annular flat part adjacent said central flat portion and an annular part inclined away from said central flat portion, an operating sleeve having a lower plate in contact with said central flat portion and an upper portion protruding out of one of said cups, a bored mounting stud having a centrally apertured upper plate with annular flat and inclined surfaces engaging said annular flat and inclined parts, welding means uniting said inclined surface and said inclined part around their edges defining circumferences of apertures in said upper plate and said centrally apertured central portion, said mounting stud having a lower portion protruding out of the other of said cups and having a mounting post on the end of said lower portion, an operating button adjustably carried by the upper portion of said operating sleeve and having a conical end adapted to actuate a control device, capillary tube means communicating with said bored mounting stud whereby pressure variations cause expansion and contraction of said diaphragms causing relative movement between said operating sleeve and said mounting stud, and stop means defined by abutment surfaces on said diaphragm cup and annular shoulders on said lower and upper plates to limit relative movement between said operating sleeve and said mounting stud

References Cited by the Examiner

UNITED STATES PATENTS

| | | | |
|---|---|---|---|
| 1,385,378 | 7/1921 | Knaak | 92—91 |
| 1,536,035 | 4/1925 | Twardowsky | 92—91 |
| 1,549,072 | 8/1925 | Dole et al. | 92—104 |
| 1,630,306 | 5/1927 | Norwood | 92—91 |
| 1,741,120 | 12/1929 | Tandberg | 92—91 |
| 2,340,685 | 2/1944 | Raney | 92—91 |

RICHARD B. WILKINSON, *Primary Examiner.*